Feb. 19, 1946.  E. M. LONG  2,395,376
GOGGLE LENS CUTTING MACHINE
Filed July 31, 1943   5 Sheets-Sheet 1

Fig. 1

INVENTOR.
Eli M. Long
BY Theodore E. Simonton
Attorney

Patented Feb. 19, 1946

2,395,376

UNITED STATES PATENT OFFICE 2,395,376

GOGGLE LENS CUTTING MACHINE

Eli M. Long, Geneva, N. Y., assignor to Shuron Optical Company, Inc., Geneva, N. Y., a corporation of New York Application July 31, 1943, Serial No. 496,973

9 Claims. (Cl. 33—28)

The invention relates to improvements in goggle lens cutting machines and, more particularly, to machines for cutting from a pre-formed blank of glass, or of any substantially rigid, transparent, molded plastic or like material, a lens of any desired perimetrical contour for use in goggles or the like for aviators, motorists, etc.

The principal purpose of the invention is to provide a simple and efficient machine for cutting a lens of any desired perimetrical contour, and particularly one of non-circular perimetrical contour, from a concavo-convex blank which is formed of such material as above specified and is a segment of a hollow right cylinder.

A further important object of the invention is to provide a machine for cutting from such a concavo-convex blank as above described, a lens of ovate perimetrical contour which is concavo-convex in the direction of the major axis of said contour, a lens so cut being ordinarily so set in a goggle frame or the like that when the goggles are in use, the major axis of the ovate perimeter of the lens extends substantially longitudinally of the interpupillary line of the wearer.

Another important object of the invention is to provide a machine having a cutter for cutting lenses such as described from blanks such as described and provisions for maintaining the cutter, throughout the operation of cutting a lens from the blank, substantially normal at the cutting point to the face of the blank being cut.

Other objects and advantages of the invention will appear from the following description of the preferred embodiment thereof in the machine illustrated in the accompanying drawings.

The machine of the embodiment shown has a main frame 10 adapted to be fixedly mounted by screws, bolts or clamps on a table, stand, bench or other suitable support. Supported in said frame are two axially aligned horizontal shafts or spindles 11 and 12 which extend longitudinally of the machine between the front and rear of the machine. Two registering blank gripping heads 13 and 13a are fixed on the adjacent ends of said shafts, said heads being preferably detachably mounted on the shaft ends. The shaft 11 is journaled in frame 10 and is held against axial movement, as shown, by means including a thrust bearing 100, and the shaft 12 is urged toward shaft 11 by a spring 14. The shaft 11 is rotative by a gear 15 fixed thereto by a set screw 16, and the shaft 12 is rotative by a like gear 17 fixed to a sleeve 18 by a set screw 19. The sleeve 18 is coaxial with both shafts and is journaled in frame 10. The shaft 12 is telescopically fitted in sleeve 18, and a cross key 20 extends through said shaft and through diametrically opposed longitudinal slots 21 in sleeve 18. Shafts 11 and 12 and their heads 13 and 13a are thus rotatable in unison by gears 15 and 17 through the means hereinafter described, but shaft 12 and its head 13a are axially shiftable relatively to shaft 11 and its head 13. The outer end of sleeve 18 is closed by a suitable cap structure 18a, and said sleeve is held against axial movement in the frame, as shown, by a thrust bearing 101 and means including a suitable collar means 18b and 18c engaged with frame 10. Spring 14 is confined in the sleeve and bears on cap 18a and an annular shoulder 12a on shaft 12. The heads 13 are of circular shape in end view and their adjacent faces are shaped to grip respectively the convex and concave faces of a blank which is a segment of a hollow right cylinder, the adjacent faces of the heads having rubber or other relatively soft and resilient facings 13b secured thereto.

The gears 15 and 17 mesh respectively with broad driving pinions 22 and 23 journaled in bearing posts 24 on frame 10 with their axes parallel to shafts 11 and 12. A driving shaft 25 parallel to shafts 11 and 12 is journaled in bearing posts 24 for rotation and for limited axial sliding movement. To one end of shaft 25 there is fixed an operating hand crank 26. Fixed on shaft 25 are two pinions 27 and 28 in mesh with pinions 22 and 23. Axial movement of shaft 25 is limited in one direction by engagement of the pinions 27 and 28 with the two bearing posts 24 for said shaft, and axial movement of the shaft in the other direction is limited by the engagement with one of said bearings of a collar 29 fixed on the shaft 25.

Figure 1:
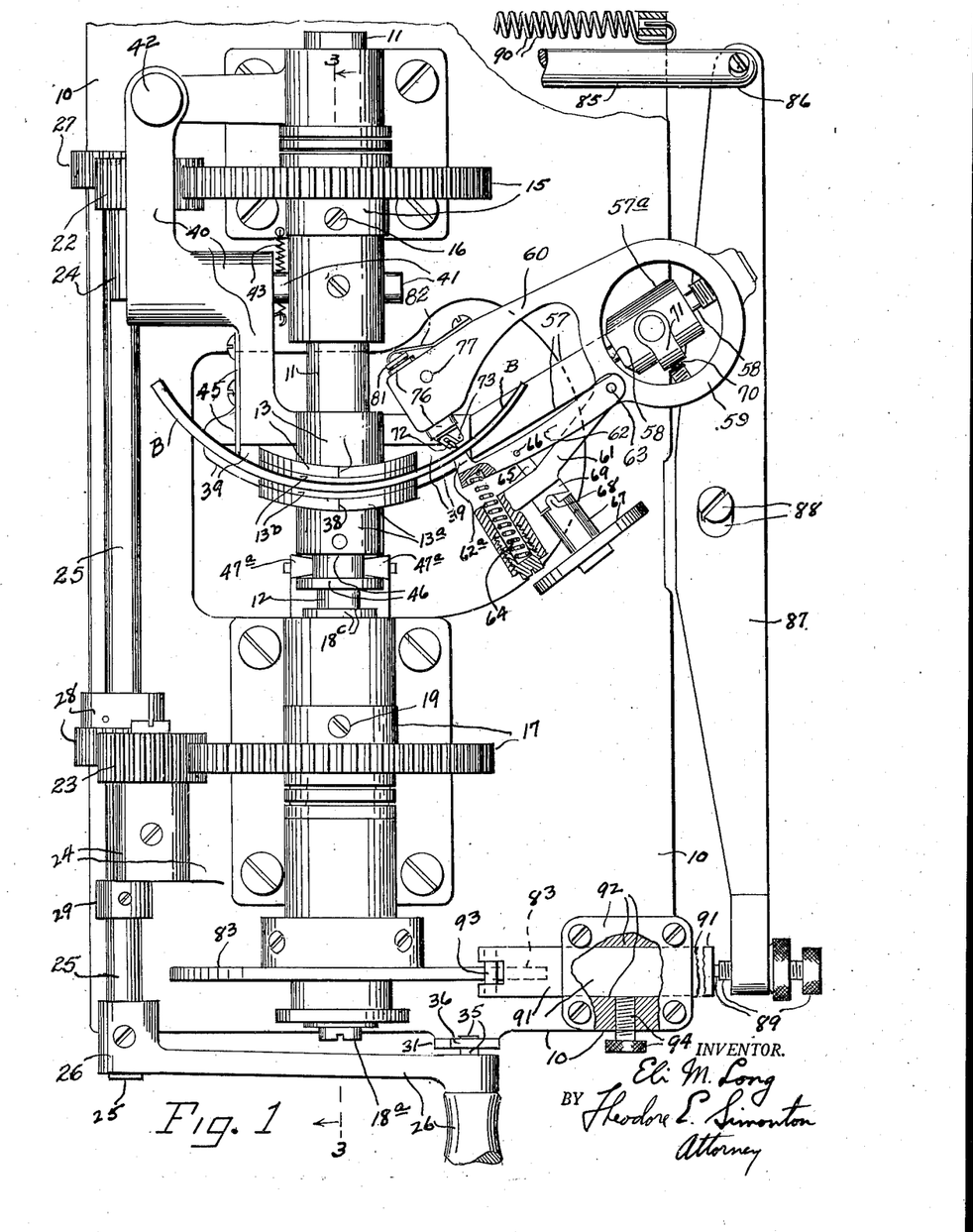
Figure 1 is a top plan view of a machine embodying the invention in its preferred form, certain parts being broken away to show details of the construction.
Figure 2:
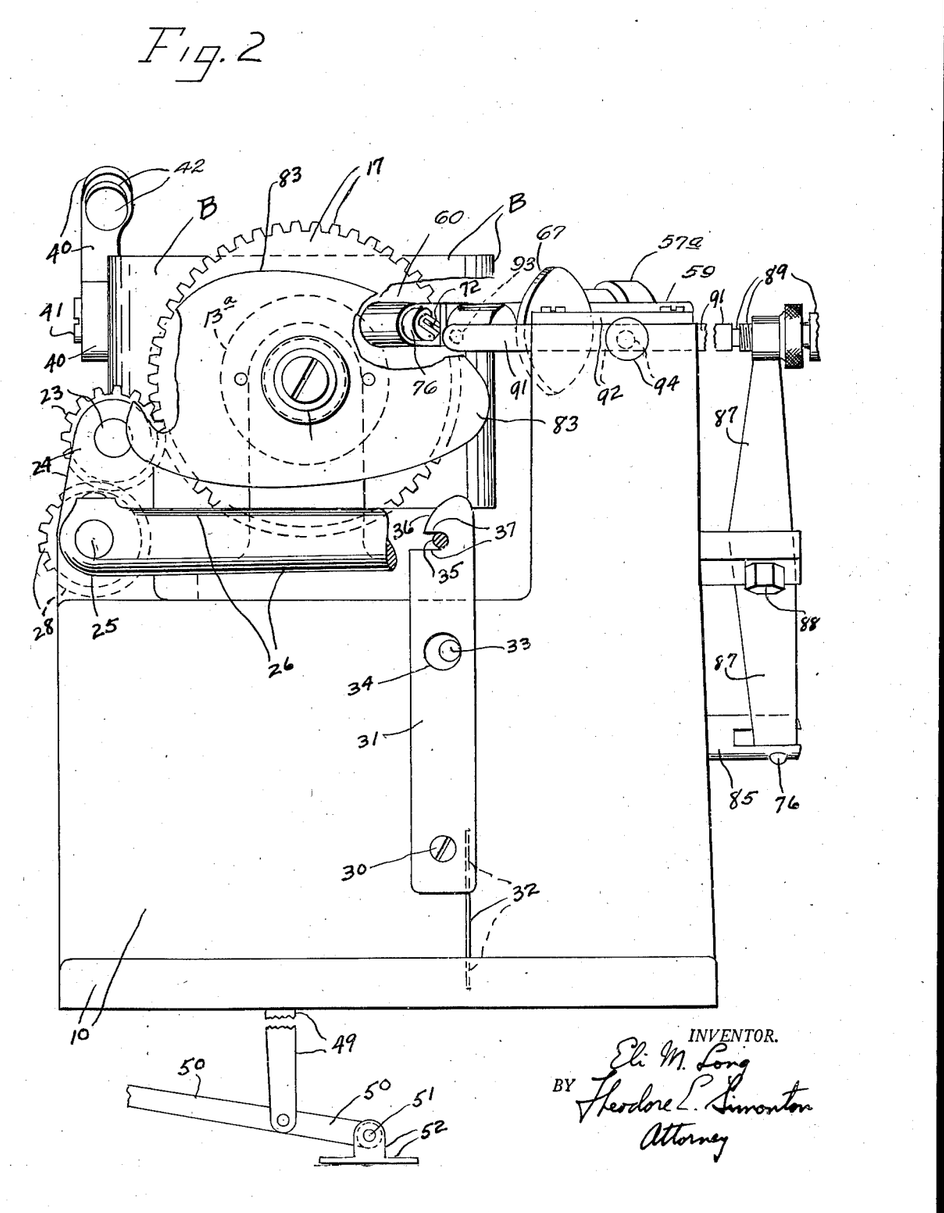
Figure 2 is an end view of the machine with certain parts broken away for clarity of illustration.

In operating the machine, the crank handle is rotated clockwise as the machine is viewed in Figure 2. There is pivoted on frame 10 at 30, to swing about an axis parallel to that of shaft 25, an upstanding latch 31 which is normally urged to the position shown in Figures 1 and 2 by a wire spring 32 anchored to the frame and latch. A stop pin 33 on frame 10 extends through an aperture 34 in the latch to limit movement of the latch. When the handle is pushed in toward the frame, a pin 35 on the handle is moved in toward the frame far enough to engage a cam nose 36 on the latch to first rock the latch rightward as viewed in Figure 2 and then be engaged (by spring return of the latch) in a transverse locking notch 36 in the latch to arrest and lock the handle in the position of the latter shown in Figures 1 and 2. This position is the starting and ending position of a lens cutting operation of the machine. When the handle is pulled outward, it may be rotated without pin 35 engaging latch 31.

The blank clamping heads 13 and 13a are provided with registering transverse peripheral incisions or other suitable markings 38. In the machine shown, it requires three revolutions of handle 26 and shaft 25 to produce one revolution of the clamping heads 13—13a and shafts 11 and 12, but it will be obvious that the gearing might be such that the relative rate of rotation of the heads per revolution of the handle is 1 to 1 or any desired multiple of 1. The markings 38, when directly over the axial line of the heads indicate the starting and ending position of a revolution of the heads for cutting a lens from the blank B. The heads are shaped so that, when positioned as in Figures 1 and 2, the heads will grip the blank B with the planar lines of the concave and convex faces of the blank extending vertically and the lines of curvature of said faces extending horizontally.

To assist in positioning such a blank for clamping thereof between the heads, a positioning or aligning device is provided which is temporarily manually movable into the field in which the blank is rotative by the machine but which is biased to move out of said field. This device comprises a flat segmental plate 39 formed on one end of a lever 40. This lever is pivoted on frame 10 to rock about a horizontal axis 41 extending transversely of and above shaft 11, said lever having an adjustable finger piece in the form of a bolt 42 threaded downwardly therethrough to engage frame 10 when the plate 39 is in a horizontal plane. When manual pressure on the head of the bolt is relieved, the force of gravity and of a spring 43 (Figure 1) rocks the plate out of the field of rotation of the blank into the position shown in dotted lines in Figure 3.

The blank B shown in the drawings is, as above pointed out, a segment of a hollow right cylinder and, in cutting from the blank an ovate lens of the kind specifically pointed out above, the blank is (as shown) elongated in the direction of its curvature, having two short planar edges and two longer curved edges, the shorter edges being perpendicular to the longer edges. The thickness of the blank may be uniform, but it is desirable, particularly for cutting ovate lenses, that, for greater accuracy of vision, the thickness of the lens shall (in a known manner and for known reasons) decrease toward the more pointed end of the ovate lens or, at least, shall decrease toward that end of the lens which in use is most remote from the medial length of the interpupillary line of the wearer of the goggles. Also, in cutting ovate lenses from elongate blanks, it is desirable to insure that the cutting tool will travel within the limits of the blank.

For the foregoing purposes, therefore, it is preferred that, as shown, the blank be provided with a printed or otherwise formed straight positioning line 44 and that the lever 40 have fixed thereto a secondary positioning or aligning plate 45 having an edge 45a which is perpendicular to plate 39 for coaction with line 44 on a blank for insuring, in conjunction with plate 39, proper positioning of the blank B for clamping and rotation of the blank by heads 13 and 13a.

For axially sliding the shaft 12 and its attached blank clamping head 13a in opposition to spring 14 to retract said head 13a from its blank-clamping relation with head 13 on shaft 11, the head 13a is formed with an annular groove 46 extending about shaft 12. In this groove there is engaged the forked end 47a of an upstanding arm of bellcrank lever 47. Lever 47 is fulcrumed at 48 on frame 10 below shaft 12 to rock about a horizontal axis extending transversely to that of shaft 12 and has an arm extending outward below said fulcrum toward that end of the machine at which the handle 26 and the outer end of shaft 12 are located. The outer end of the last-mentioned arm of lever 47 is connected by a pendent link 49 with a treadle 50. Treadle 50 is fulcrumed for up and down movement about a horizontal fulcrum 51, the axis of which fulcrum extends parallel to that of shaft 12, the link 49 being connected to the treadle between the treadle fulcrum and the free forward end of the treadle. The treadle fulcrum is fixed to a bearing block 52 which may be fixed to the floor or to frame 10, or to a support for frame 10. The free end of the treadle is located adjacent the front of the machine and is normally held elevated by spring 14 which also normally urges head 13a to head 13.

For cutting a lens from a blank such as described, clamped in the machine as above described, the following means are provided in the improved machine, said means being controlled conjointly by the blank B and by a cam mechanism which determines the perimetrical dimensions and contour of the lens to be cut from the blank, the arrangement being such that the lens cutter is always maintained approximately normal, at the cutting point, to that face of the blank on which the cutter acts.

Journaled in frame 10 on a vertical pivot 53, which is located under shaft 11 and which is perpendicular to the axial line of the horizontal shafts 11 and 12 and of the heads 13 and 13a fixed to said shafts, is a two-arm lever 54—55, the free end of the arm 55 of which lever carries a vertical pivot 56. The distance in a horizontal line between the vertical pivots 53 and 56 is equal to, or substantially equal to, the radius of the curved face of the concavo-convex blank on which the cutter acts. This face of the blank in the machine shown is the concave face of the blank. Arm 55 may, therefore, be designated as a radius arm, since the effective length of said arm corresponds to the radius of the cylindrical surface of the blank from which a lens is to be cut by the cutter of the machine.

Pivotally held to vertical pivot 56 on radius arm 55 is the forked inner end of a horizontally swingable arm 57 which is formed at its free end with a fixed head 57a through which extends a horizontal bearing pin 58 for a gimbal ring 59. The axial line of the gimbal ring bearing pin 58 is radial to, or substantially radial to, the pivot 56. The gimbal ring 59 has fixed thereto, or formed integrally therewith, two rigid arms 60 and 61. The arm 60 carries the blank cutter for engagement with the concave face of the blank and arm 61 carries a counter pressure member for engagement with the convex face of the blank in the machine shown. It will be obvious, however, that the machine may be arranged for cutting action on the convex face of the blank, if desired, or for cutting action on both the convex and concave faces of the blank.

The counter pressure member is preferably an arm 62 pivoted at 63 on the arm 61 to swing about an axis perpendicular to the plane of the gimbal ring 59 and extending in the direction of arms 60 and 61. The arms 60, 61 and 62 extend toward pivot 56 and terminate short thereof for the purpose hereinafter described, the arm 62 having a small blank-engaging pressure head or projection 62a which extends toward arm 60 in the plane swinging motion of arm 62. Suitable means are provided for preventing the projection 62a on arm 62 (which projection is opposed to the lens cutter) from engaging the cutter when no blank is in the machine, and also for retracting arm 62 and projection 62a (hereinafter described) for free insertion of a blank in, and free removal of a blank from, the machine.

Figures 4, 5, 6, 7:
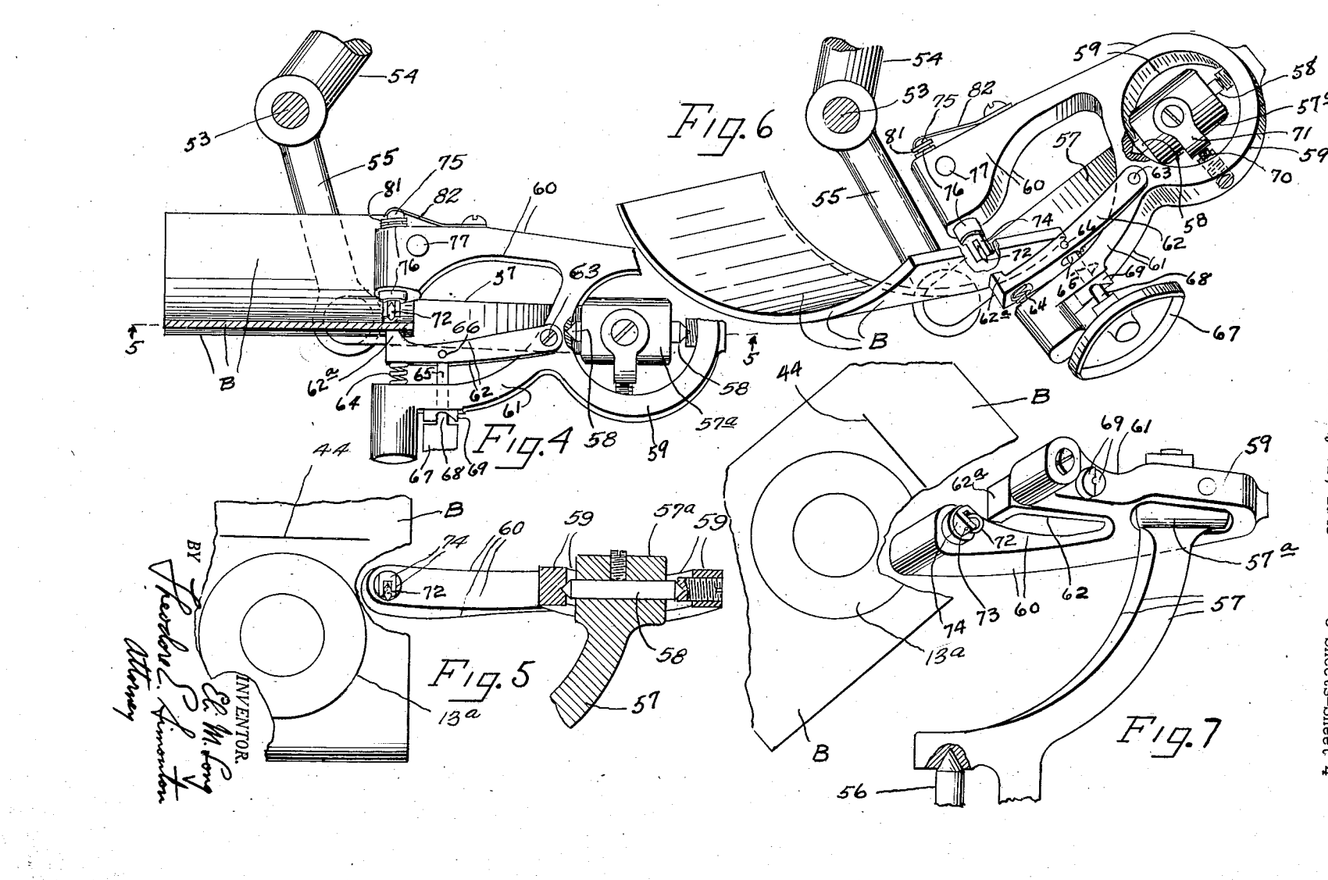
Figure 4 is a detail plan view illustrating the cutting action at one stage thereof.
Figure 5 is a view approximately on the line 5—5 of Figure 4.
Figure 6 is a detail plan view illustrating another stage of the cutting operation.
Figure 7 is an end elevation of the parts positioned as shown in Figure 6.

The means for controlling swinging of arm 62 about its pivot 63 relatively to arm 61 comprise a spring 64 engaged with said arms to urge arm 62 toward the cutter carrying arm 60 and away from arm 61. A rod 76 anchored to arm 61 at 66 extends through a suitable clearance aperture in arm 61 and has rotatively journaled thereon a finger wheel 67 formed with a rib 68 or the like extending transversely of the rod for coaction with a suitable cam 69 formed on or fixed to arm 61. When wheel 67 is in the position shown in Figures 1, 4 and 6, the arm 62 is free to move inward closer to the cutter than the thickness of the blank but not close enough for projection 62a to touch and damage the cutter. By turning the wheel 67, the arm 62 may be cammed toward arm 61 and locked in rather widely spaced relation to the cutter for blank insertion and removal, the cam 69 having a flat surface for engagement by rib 68 to lock arm 62 in its last mentioned position.

Rocking of the gimbal ring about its pivotal axis is preferably retarded or resisted by a friction pad 70 held to the ring and bearing on a surface or element 71 formed on or held to head 57a of arm 57.

The cutting element of the machine is preferably a thin knife edged cutting wheel 72 having a circular cutting edge, although it will be obvious that a pointed cutting diamond or other pointed cutting element might be used. The cutter wheel 72 is a caster wheel journaled on an axis 73 in a yoke-like caster stock 74 formed on one end of a caster swivel post 75, the axis of the wheel being at a right angle to the axial line of the post and slightly offset laterally from said axial line of the post, as is usual in caster constructions. The swivel post of the wheel caster construction is journaled in a bearing sleeve 76 extending through the outer end of arm 60 perpendicularly to the axial line of gimbal ring pivot pin 58 and parallel to the plane of gimbal ring 59 so that, in all tilted positions of the gimbal ring the axial line of the swivel post will pass through the axial line of the gimbal pivot pin. The bearing sleeve 76 is non-rotatively held to arm 60 by a suitable key or pin 77.

Figure 8:
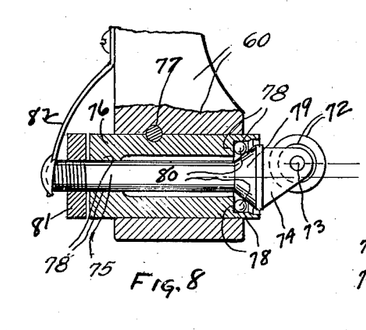
Figures 8 and 9 are detail views showing the cutter mounting.
Figure 9:
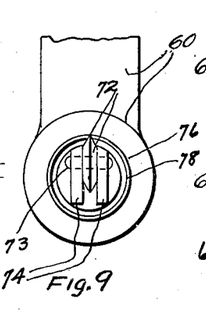
Figure 10:
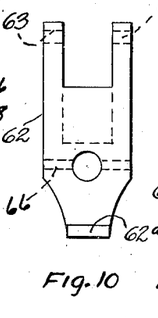
Figures 10 and 11 are detail views showing the counter pressure arm or element opposed to the cutter.
Figure 11:
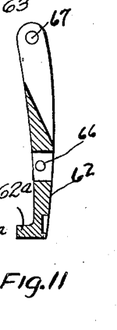
Figure 12:
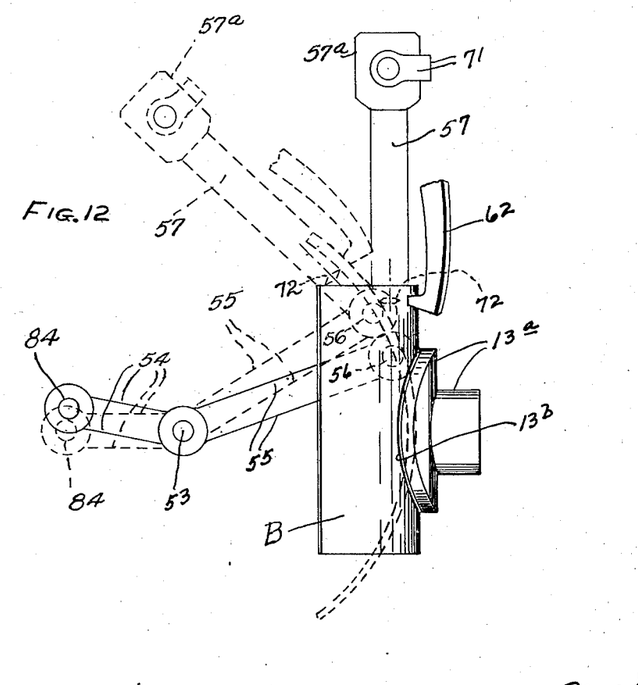
Figure 12 is a diagrammatic view further illustrating the operation of the machine.

The outer end of bearing sleeve 76 protrudes beyond the outer side edge of arm 60 and has adjacent said outer end of said sleeve a bearing 78 (Figure 8) for the caster swivel post 75. The inner end of the sleeve protrudes from the inner side edge of arm 60 toward arms 61 and 62 and is opposed to the blank-engaging projection 62a on arm 62. At said inner end of the bearing sleeve there is provided a ball bearing construction adapted to take thrust axially and transversely of the swivel post, said thrust bearing construction comprising a cylindrical counterbore 78 in the inner end of sleeve 76, a conoidal enlargement 79 of the swivel post adjacent the junction of the caster post 75 and of the caster wheel journaling yoke 74, and a suitable annular series of bearing balls 80 confined in said cylindrical counterbore by said conoidal post enlargement. The conoidal post enlargement 79 tapers toward the axial line of the swivel post away from the yoke 74 and toward the outer end of said post.

Figures 2, 3:
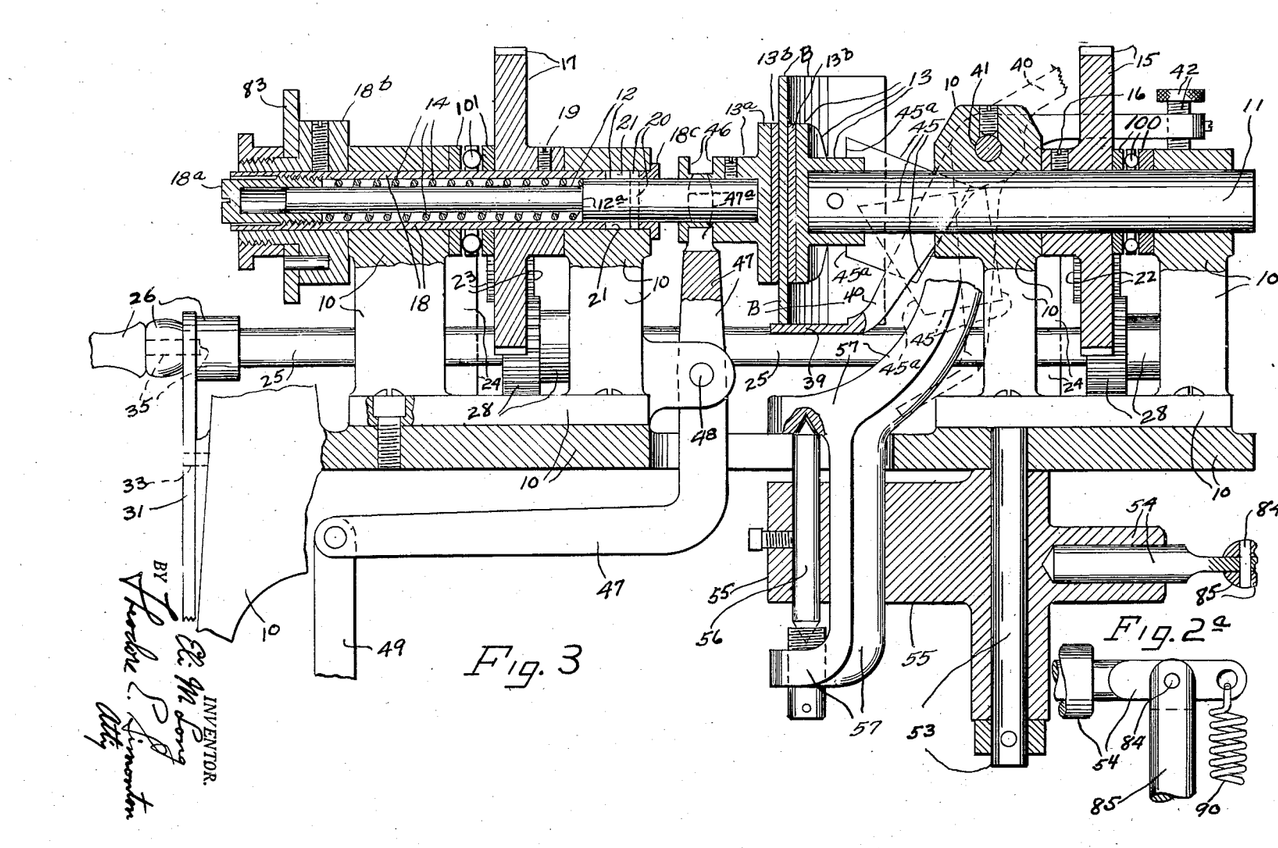
Figure 3 is a view partly in vertical section on the line 3—3 of Figure 1.

It will be obvious that, when a blank B is positioned in the machine as shown in Figures 1, 2 and 3, with the handle 76 latched as shown in Figures 1, 2 and 3 and with the blank-clamping heads 13 and 13a rotated into the position shown in said Figures 1, 2 and 3 with the indicating marks 38 positioned as therein shown, upon rotation of finger wheel 67 into the position shown in Figure 1, the arm 62 and its projection 62a will yieldingly press against the convex face of blank B and draw the periphery of the caster wheel yieldingly to the concave face of said blank until the swivel post of the caster wheel is pressed outward as far as its thrust bearing will permit, the spring 75 being stronger than the spring 82 hereinafter described. In this position, the point of contact of the periphery of the wheel with the blank will oscillate, during a rotation of the blank, about and in contact with a straight line which is the axial line of the gimbal ring pivot pin 58, which axial line always lies in a vertical plane passing through the vertical axial line of pivot 56, and the cutter wheel will always remain substantially normal to the surface being cut at the cutting point. There will be very slight variations from an ideal normal disposition of the wheel to the concave face of the blank due to the swiveling movement of the caster post but, if a cutting diamond were set in the inner end of the swivel post coaxially with the post, such ideal condition could be attained.

It will be obvious that the starting and finishing points of the cutting of a lens from the blank coincide. It is desirable that the caster wheel should start to cut a new lens in the same position relatively to the new blank in which it finished cutting a lens from the precedent blank. To permit this, and to avoid lens or blank damaging action due to caster swiveling at the start of a new operation to cause the wheel to assume its proper draft for cutting, there is mounted on the outer protruding end of the swivel post 75 a friction brake head 81, preferably in the form of a nut threaded on said post. The brake head 81 is so positioned that clamping of a blank B between the cutter wheel and projection 62a of arm 62 displaces said brake head slightly from the outer end of the bearing sleeve 76 but that when arm 62 is drawn toward arm 61 by the cam means 67—68—69, said brake head 81 will be instantly pressed against the outer end of sleeve 76 by a spring 82 to frictionally hold the caster post 75 against rotation. Spring 82 is anchored to arm 60 and has a cupped end engaged over the outer end of caster swivel post 75, said spring being more weak than spring 64 which presses projection 62a of arm 62 toward the periphery of the cutting wheel 72.

A contour and size controlling plate cam 83 is detachably fixed to collar 18b on the outer end of sleeve 18 to rotate with the shaft 12 which carries blank clamping head 13a. The contour and dimensions of the periphery of this cam determine the contour and dimensions of the perimeter of the lens which the machine will cut from one of the blanks B. The cam shown has an ovate periphery and is so fixed to sleeve 18 that, in the position of the parts shown in Figures 1, 2 and 3, the major axis of its periphery extends horizontally, or substantially so, transversely of the sleeve, the more pointed end of the cam being directed toward the right or rear of the machine as viewed in Figure 2. This cam is a planar development of the lens to be cut, that is, it corresponds in size and perimetrical contour to that which the desired lens would have if the lens were flattened into a plane.

The arm 54 of lever 54—55 has pivoted thereto at 84 at link 85 which extends rearwardly from said arm and is pivoted at 86 to one end of a lever 87. The lever 87 extends longitudinally of the machine at the rear of the machine and is pivoted on frame 10 substantially medially of the ends of said lever to rock about an upstanding pivot or axis 88, which pivot inclines upward and toward that end of the machine at which link 85 is located. The other end of lever 87 has threaded therethrough a suitable adjustable screw 89 which extends horizontally transversely of sleeve 18. The forward end of screw 89 is constantly pressed by a spring 90 against the rear end of a fore and aft extending slide bar 91, which slide bar is guided in frame 10 at 92 to move horizontally transversely of sleeve 18. In the forward end of slide bar 91 there is journaled on a horizontal axis parallel to that of the cam 83 an antifriction roller 93 which is constantly pressed to the periphery of the cam 83 by the spring 90. The cutter is thus constrained by the facial contour of the blank and by the cam mechanism to cut a contour determined by the perimetrical contour of the cam when a blank B is rotated by heads 13 and 13a with the blank gripped between said heads and between the cutter wheel 72 and projection 62a of arm 62. Spring 90 is anchored to the frame 10 and to arm 54 of lever 54—55 as shown. If it should be desired to cut a lens with a circular periphery, this could be done by using a cam 83 having a circular periphery. In the latter case, lever 54—55 would not rock during a revolution of the blank. Where cam 83 has an ovate or other non-circular contour, the lever 54—55 is rocked about its fulcrum under control of the cam and blank. The facial contour of the blank B, as the blank revolves, causes such rocking of the arm 57, and also of the gimbal ring 59 (which carries arms 60, 61 and 62 and the caster mounted cutter wheel 72); that said wheel 72 makes a rolling draw cut, the wheel being always substantially normal to the concave face of the blank at the cutting point and the periphery of the wheel always acting on said blank face slightly in advance of the point of intersection of the axial line of the swivel post with said blank face.

As hereinbefore pointed out, it will be obvious that the parts may easily be re-arranged for cutting action of the cutter wheel on the convex face of the blank B.

Preferably, as shown, the gimbal ring pivot pin 58 and the slide bar 91 are located at levels above the horizontal level of the axis of rotation of shafts 11 and 12 and cam 83. If desired, a set screw 94 may be threaded in frame 10 for screwing inward of the set screw to lock slide bar 91 to the frame during mounting or replacement of cam 83 in the machine.

The location of the pivot 53 is such that the arcuate path in which the vertical axial line of pivot 56 is shiftable by rocking of lever 54—55 intersects the axis of rotation of shafts 11 and 12 and heads 13 and 13a at the center of the convex face of head 13 which bears on the concave face of the blank B, i. e., at the point where said axis of rotation intersects that face of the blank upon which the cutter acts.

It will be noted that, as hereinbefore described, the cutter wheel 72 and the substantially opposed blank-face-engaging projection 62a on arm 62 are so located that during cutting of a lens, they always grip the opposed arcuate faces of the lens blank B at a point which is located between the free rear end of arm 57 on which the gimbal ring 59 is journaled and the vertical axial line of the pivot 56, and that the blank will therefore exert a levering force on arm 57 during revolution of the blank to swing said arm 57 about pivot 56 as required by the facial contour of the blank gripped between wheel 72 and projection 62a on arm 62. Since the gimbal ring 59 and its connected arms 60, 61 and 62 are oscillative about the gimbal bearings 58 carried by and arranged on the free end of arm 57 as hereinbefore described, it will be obvious that the gimbal ring and the arms 60, 61 and 62, and also the blank cutting wheel 72 and the projection 62a on arm 62, will be oscillated as a unit about the axial line of bearings 58 by the rotating blank, and in response to the facial contour of the blank, throughout a revolution of the blank to maintain the cutter wheel constantly substantially normal to that face of the blank upon which said wheel acts.

The arm 55 which carries the pivot 56 is controlled by cam 83 to swing about its pivotal axis 53 when and as required for cutting a lens of non-circular perimetrical contour from the blank.

It is important, in cutting lenses of any perimetrical contour from blanks, that the periphery cutting cutter be maintained substantially normal to that face of the blank upon which the cutter acts in order that the cutter may cut with maximum efficiency and that the cutter will not so act on the blank as to damage either the blank as a whole or the lens being cut from the blank.

I claim:

1. In a lens cutting machine, means for cutting a lens having a non-circular perimetrical contour, from a lens blank which is a segment of a hollow right cylinder, comprising, in combination, means for gripping opposite faces of the blank within the edge borders of the blank, means for rotating said gripping means about a fixed axis which is radial to one of the arcuate faces of the blank to thereby rotate the gripped blank about said fixed axis, a radius arm rotative about a second fixed axis which is perpendicular to the first-mentioned fixed axis, a second arm pivoted to said radius arm for swinging about a third axis which is parallel to said second fixed axis and is spaced from the latter a distance substantially equal to the radius of said one arcuate face of the blank, a cutting element for acting on said one arcuate face of the blank, a counter-pressure element for engaging the other arcuate face of the blank substantially in opposed relation to said cutting element, means mounted on said second arm for supporting said elements for concomitant engagement thereof with opposite ones of the arcuate faces of the blank throughout rotation of the blank and for concomitant oscillation of said elements, while so engaged, about a fourth axis which is constantly radial to said pivotal axis of said second arm, a contour determining cam rotative with said blank-gripping means about said first fixed axis, and means spring urged to the periphery of said cam and positively connected to said radius arm for rocking the latter about said second fixed axis in response to variations of the peripheral contour of the cam from a true circle whose center is said first fixed axis.

2. A lens cutting machine as claimed in claim 1, wherein the supporting means mounted on the second arm for supporting the lens cutting element and counter-pressure element comprises a two-arm yoke oscillative about said fourth axis relatively to said second arm, a caster carried by one arm of said yoke with its swivel axis normal to said fourth axis and its wheel having a cutting periphery extending to said fourth axis, a support for the counter-pressure element on the second arm of the yoke supporting the counter-pressure element for movement toward and from the periphery of the cutter wheel, spring means for urging the counter-pressure element toward the periphery of said wheel, and means for arresting spring movement of the counter-pressure element before it contacts the periphery of said wheel and for retracting said element from the wheel and locking it so retracted.

3. In a lens cutting machine of the kind described wherein a counter-pressure element and an opposed caster the wheel of which has a lens blank cutting periphery are adapted to receive edgewise therebetween a lens blank which is rotated between said element and the periphery of the wheel of said caster, a mounting for said caster and element including a swivel bearing sleeve for the caster, a brake head mounted on the swivel post of the caster for rotation with said post, a spring urging the swivel post of the caster axially to engage the brake head with one end of said bearing sleeve, means supporting said element to move toward and from the periphery of the wheel of the caster, a spring of greater strength than the first spring for urging said element toward the periphery of said wheel and shifting the caster post axially to a fixed limit in opposition to the first spring, and cam controlled means for preventing said element from engaging the periphery of the wheel under force of the second spring and operable at will to retract said element from said wheel and to lock said element in retracted position.

4. A machine for cutting a lens of desired perimetrical contour from a lens blank having the shape of a segment of a hollow right cylinder of selected radius comprising, in combination, means to rotate a lens blank of the specified shape about a fixed axis with the axis of curvature of the arcuate faces of the blank normal to said fixed axis, a radius element pivoted to swing about a fixed axis normal to the axis of blank rotation, a second radius element pivotally jointed to the first element at a distance from the fixed pivotal axis of said first element corresponding substantially with the radius of curvature of one arcuate face of a blank from which the lens is to be cut, a cutting element for acting on said one arcuate face of the blank, a counter-pressure element for engaging the other arcuate face of the blank, means mounted on said second radius element for supporting said cutting and counter-pressure elements for gripping of a blank therebetween at a point located between the free end of the second radius element and the pivotal axis of the joint connecting said radius elements, said supporting means supporting said cutting and counter-pressure elements for free oscillation thereof as a unit relatively to the second radius element about an axis normal to that of the pivotal axis of the joint connecting the radius elements, and means to govern swinging of the first radius element about its fixed pivotal axis to determine the perimetrical contour of the lens.

5. A machine for cutting from a lens blank, having the shape of a segment of a hollow right cylinder of predetermined radius, a lens having a non-circular perimeter comprising, in combination, means to rotate a lens blank of the specified shape about a fixed axis with the axis of curvature of the arcuate faces of the blank normal to said fixed axis, a radius element pivoted to swing about a fixed axis normal to the axis of blank rotation, a second radius element pivotally jointed to the first radius element at a distance from the fixed pivotal axis of the first radius element corresponding substantially with the radius of curvature of one arcuate face of the blank from which the lens is to be cut, a cutting element for acting on said one arcuate face of the blank, a counter-pressure element for engaging the other arcuate face of the blank, means mounted on said second radius element for supporting said cutting and counter-pressure elements for gripping of a blank therebetween at a point located between the free end of the second radius element and the pivotal axis of the joint connecting said radius elements, said supporting means supporting said cutting and counter-pressure elements for free oscillation thereof as a unit relatively to the second radius element about an axis normal to that of the pivotal axis of the joint connecting the radius elements, and means controlled by the blank rotating means to oscillate the first radius element to cause said cutting element to incise a blank in a predetermined endless and non-circular path on each revolution of the blank.

6. A machine for cutting a lens of desired perimetrical contour from a lens blank which is a segment of a hollow right cylinder of selected radius comprising, in combination, means to centrally grip a lens blank of the specified shape and rotate the gripped blank about a fixed axis with the axis of curvature of the blank normal to said fixed axis, an arm pivotally mounted at one end thereof to rock about an axis which extends at a right angle to said fixed axis, a cutting element, a counter-pressure element, a carrier for said elements pivotally mounted on the arm for free oscillation thereof about an axis normal to the pivotal axis of the arm and supporting said elements to engage the opposite faces of a gripped blank at substantially opposed points located between the pivotal axis of the arm and the pivotal mounting of the carrier on the arm, and means for supporting the pivotal axis of the arm at a distance from the axis of curvature of the cutting-element-engaged face of the gripped blank equal to the radius of curvature of said blank face.

7. A machine for cutting a lens of selected non-circular perimetrical contour from a lens blank which is a segment of a hollow right cylinder of selected radius comprising, in combination, means to centrally grip a lens blank of the specified shape and rotate the gripped blank about a fixed axis with the axis of curvature of the blank normal to said fixed axis, an arm pivotally mounted at one end to rock about an axis which extends at a right angle to said fixed axis, a cutting element, a counter-pressure element, a carrier for said elements pivotally mounted on the arm for free oscillation thereof about an axis normal to the pivotal axis of the arm and supporting said elements to engage the opposite faces of a gripped blank at substantially opposed points located between the pivotal axis of the arm and the pivotal mounting of the carrier on the arm, a support to which the arm is pivoted and which is oscillative about a fixed pivotal axis which is normal to the axis of blank rotation and is parallel to the pivotal axis of the arm, and means controlled by the blank gripping and rotating means for oscillating said support through a fixed cycle per revolution of the blank to cause the cutting element to incise the blank in a predetermined endless and non-circular path on each revolution of the blank, the distance between the pivotal axes of said support and arm corresponding substantially to the radius of curvature of the blank face to be incised by the cutting element.

8. A machine for cutting, from a lens blank having the shape of a hollow right cylinder of selected radius, a lens having a selected non-circular perimetrical contour, said machine comprising, in combination, a radius device having two parts pivotally jointed for relative folding and unfolding movements therebetween and having one of its parts pivoted for swinging of said device bodily about a fixed axis parallel to that of the pivotal joint between said parts, a cutting element, means mounting said cutting element on the other one of said parts of the radius device intermediate the ends of said part for movement of said cutting element with said other part as a unit and for free oscillation of said cutting element relatively to said other part about an axis normal to that of the said pivotal joint, means to centrally grip a lens blank of the specified shape and rotate the gripped blank about a fixed axis normal to the fixed pivotal axis of the radius device with the axis of curvature of the gripped blank normal to the axis of blank rotation and intersecting the latter axis at the same point therealong at which said latter axis is intersected by said fixed pivotal axis of the radius device, and pattern-controlled means responsive to each revolution of a lens blank by the blank gripping and rotating means to oscillate the radius device about its fixed pivotal axis to so vary the distance from the axis of blank rotation at which the cutting element is contactive with the rotating blank as to cause the cutting element to incise the blank in an endless non-circular path.

9. A lens cutting machine, as claimed in claim 8, having means associated with the cutting element to automatically maintain the cutting element in pressure contact with a blank gripped and being rotated by the blank gripping and rotating means.

ELI M. LONG.